US012803119B2

(12) United States Patent
Kondo et al.

(10) Patent No.: US 12,803,119 B2
(45) Date of Patent: Nov. 17, 2026

(54) LITHIUM SECONDARY BATTERY

(71) Applicant: Panasonic Intellectual Property Management Co., Ltd., Kadoma (JP)

(72) Inventors: Shinichiro Kondo, Osaka Fu (JP); Ryohei Miyamae, Osaka Fu (JP); Akira Kano, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 548 days.

(21) Appl. No.: 18/276,529

(22) PCT Filed: Feb. 10, 2022

(86) PCT No.: PCT/JP2022/005481
§ 371 (c)(1),
(2) Date: Aug. 9, 2023

(87) PCT Pub. No.: WO2022/181363
PCT Pub. Date: Sep. 1, 2022

(65) Prior Publication Data
US 2024/0128591 A1 Apr. 18, 2024

(30) Foreign Application Priority Data
Feb. 26, 2021 (JP) ................................ 2021-030893

(51) Int. Cl.
*H01M 50/477* (2021.01)
*H01M 10/052* (2010.01)
(Continued)

(52) U.S. Cl.
CPC ....... *H01M 50/477* (2021.01); *H01M 10/052* (2013.01); *H01M 10/058* (2013.01); *H01M 50/474* (2021.01); *H01M 50/486* (2021.01)

(58) Field of Classification Search
CPC . H01M 50/474; H01M 50/477; H01M 50/486
See application file for complete search history.

(56) References Cited

U.S. PATENT DOCUMENTS

2012/0171536 A1 7/2012 Kaneda
2013/0059192 A1 3/2013 Kajita et al.
(Continued)

FOREIGN PATENT DOCUMENTS

CN 110556539 A 12/2019
CN 114846665 A 8/2022
(Continued)

OTHER PUBLICATIONS

International Search Report dated Mar. 22, 2022, issued in counterpart International Application No. PCT/JP2022/005481 (3 pages).
(Continued)

*Primary Examiner* — Brittany L Raymond
(74) *Attorney, Agent, or Firm* — WHDA, LLP

(57) ABSTRACT

A lithium secondary battery includes a positive electrode, a negative electrode disposed opposed to the positive electrode, a separator interposed between the positive electrode and the negative electrode, a non-aqueous electrolyte having a lithium ion conductivity, and a spacer interposed between the negative electrode and the separator. A lithium metal deposits on the negative electrode during charging, and the lithium metal dissolves from the negative electrode during discharging. The spacer has a net structure formed with a plurality of lined projected portions.

12 Claims, 9 Drawing Sheets

(51) Int. Cl.

| | |
|---|---|
| ***H01M 10/058*** | (2010.01) |
| ***H01M 50/474*** | (2021.01) |
| ***H01M 50/486*** | (2021.01) |

(56) References Cited

U.S. PATENT DOCUMENTS

| | | | | |
|---|---|---|---|---|
| 2014/0186686 | A1 | 7/2014 | Takahashi et al. | |
| 2015/0188185 | A1 | 7/2015 | Taylor et al. | |
| 2016/0285064 | A1 | 9/2016 | Hatta et al. | |
| 2016/0372755 | A1 | 12/2016 | Sauter et al. | |
| 2018/0069221 | A1 | 3/2018 | Takahashi et al. | |
| 2019/0280339 | A1* | 9/2019 | Kano .................... | H01M 4/661 |
| 2019/0288291 | A1 | 9/2019 | Choi et al. | |
| 2019/0372125 | A1 | 12/2019 | Miyamae et al. | |
| 2019/0372152 | A1 | 12/2019 | Miyamae et al. | |
| 2019/0372153 | A1 | 12/2019 | Miyamae et al. | |
| 2020/0328423 | A1 | 10/2020 | Li et al. | |
| 2021/0013502 | A1 | 1/2021 | Lim et al. | |
| 2021/0104723 | A1 | 4/2021 | Chae et al. | |
| 2021/0265617 | A1 | 8/2021 | Okano et al. | |
| 2022/0059826 | A1 | 2/2022 | Chen et al. | |
| 2023/0032198 | A1 | 2/2023 | Sadakane et al. | |
| 2023/0042242 | A1 | 2/2023 | Sadakane et al. | |
| 2023/0361431 | A1 | 11/2023 | Okano | |
| 2024/0021907 | A1 | 1/2024 | Murayama et al. | |
| 2024/0387861 | A1 | 11/2024 | Miyamae et al. | |
| 2024/0405373 | A1 | 12/2024 | Miyamae et al. | |
| 2024/0429561 | A1 | 12/2024 | Miyamae et al. | |
| 2024/0429562 | A1 | 12/2024 | Miyamae et al. | |

FOREIGN PATENT DOCUMENTS

| | | | | |
|---|---|---|---|---|
| CN | 114868291 | A | | 8/2022 |
| EP | 2978046 | A1 | | 1/2016 |
| EP | 3 537 520 | A1 | | 9/2019 |
| EP | 4254581 | A1 | | 10/2023 |
| EP | 4411913 | A1 | | 8/2024 |
| EP | 4411914 | A1 | | 8/2024 |
| EP | 4411915 | A1 | | 8/2024 |
| EP | 4411964 | A1 | | 8/2024 |
| JP | 2014-199801 | A | | 10/2014 |
| JP | 2015-022921 | A | | 2/2015 |
| JP | 2015-138770 | A | | 7/2015 |
| JP | 2016-066629 | A | | 4/2016 |
| JP | 2017-504931 | A | | 2/2017 |
| JP | 2019-212432 | A | | 12/2019 |
| JP | 2019-212603 | A | | 12/2019 |
| JP | 2019-212605 | A | | 12/2019 |
| JP | 2021-174701 | A | | 11/2021 |
| WO | 2019/009017 | A1 | | 1/2019 |
| WO | WO 2019-009017 | | * | 1/2019 |
| WO | 2020/061565 | A1 | | 3/2020 |
| WO | WO 2020-061565 | | * | 3/2020 |
| WO | 2020/066254 | A1 | | 4/2020 |
| WO | 2021/023196 | A1 | | 2/2021 |
| WO | 2021/131533 | A1 | | 7/2021 |
| WO | 2021/131534 | A1 | | 7/2021 |
| WO | 2022/045127 | A1 | | 3/2022 |

OTHER PUBLICATIONS

Office Action dated Apr. 11, 2026, issued in counterpart CN Application No. 202280016797.7, with partial English translation. (9 pages).

Office Action dated Aug. 25, 2026, issued in related IN Application No. 202417089281. (8 pages).

* cited by examiner

LITHIUM SECONDARY BATTERY

CROSS-REFERENCE TO RELATED APPLICATIONS

This application is a National Phase Application filed under 35 U.S.C. § 371 of International Application No. PCT/JP2022/005481 filed on Feb. 10, 2022 which claims the benefit of priority under 35 U.S.C. § 119(a) of Japanese Patent Application No. 2021-030893 filed on Feb. 26, 2021 in Japan, the contents of which are incorporated herein by reference.

TECHNICAL FIELD

The present disclosure relates to a lithium secondary battery including a lithium ion conductive non-aqueous electrolyte.

BACKGROUND ART

Non-aqueous electrolyte secondary batteries are used, for example, in applications for ICT such as personal computers and smartphones, in-vehicle applications, and power storage applications. In such an application, the non-aqueous electrolyte secondary battery is required to have a higher capacity. Lithium ion batteries are known as a high-capacity non-aqueous electrolyte secondary battery. A high capacity lithium ion battery can be achieved by using, as a negative electrode active material, for example, graphite and an alloy active material such as a silicon compound in combination. However, the capacity increase of the lithium ion battery is reaching the limit.

Lithium secondary batteries (lithium metal secondary batteries) are promising as a high-capacity non-aqueous electrolyte secondary battery exceeding lithium ion batteries. In lithium secondary batteries, a lithium metal deposits on the negative electrode during charging, and the lithium metal dissolves into the non-aqueous electrolyte during discharging.

Patent Literature 1 proposed, to suppress expansion of the negative electrode by lithium metal deposition, providing a plurality of projected portions on both surfaces of the negative electrode current collector in the lithium secondary battery.

CITATION LIST

Patent Literature

PLT1: Japanese Laid-Open Patent Publication No. 2019-212603

SUMMARY OF INVENTION

Solution to Problem

The plurality of projected portions described in Patent Literature 1 are each disposed independently and noncontinuously. In this case, the pressure applied to the electrode increases locally at the time of lithium metal deposition, which damages the electrodes, and may reduce cycle characteristics.

Solution to Problem

An aspect of the present disclosure relates to a lithium secondary battery including a positive electrode, a negative electrode disposed oppose to the positive electrode, a separator interposed between the positive electrode and the negative electrode, a non-aqueous electrolyte having a lithium ion conductivity, and a spacer interposed between the negative electrode and the separator, wherein a lithium metal deposits on the negative electrode during charging, and the lithium metal dissolves from the negative electrode during discharging, and the spacer has a net structure formed with a plurality of lined projected portions.

Effects of Invention

With the present disclosure, reduction in cycle characteristics of a lithium secondary battery can be suppressed.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

A lithium secondary battery in an embodiment of the present disclosure includes a positive electrode, a negative electrode disposed opposed to the positive electrode, a separator disposed between the positive electrode and the negative electrode, a non-aqueous electrolyte having a lithium ion conductivity, and a spacer disposed between the negative electrode and the separator. The spacer has a net structure formed with a plurality of lined projected portions. The lithium secondary battery is a type of a secondary battery in which a lithium metal deposits on the negative electrode during charging, and the lithium metal dissolves from the negative electrode during discharging. In the following, the positive electrode and the negative electrode may be referred to as an electrode.

The spacer ensures a space where the lithium metal deposits on the negative electrode surface, and the volume change of the negative electrode involved with the lithium metal deposition is reduced. The spacer disposed between the negative electrode and the separator is more advantageous in terms of improvement in the initial capacity than the case where it is disposed between the positive electrode and the separator, because release of lithium ions from the positive electrode during initial charging is performed smoothly. The spacer can be provided on a surface of the negative electrode, or can be provided on a surface of the separator facing the negative electrode. In the following, the negative electrode with a spacer provided on its surface is also referred to as a negative electrode unit. Furthermore, the separator with a spacer provided on its surface is also referred to as a composite separator.

Figure 7:
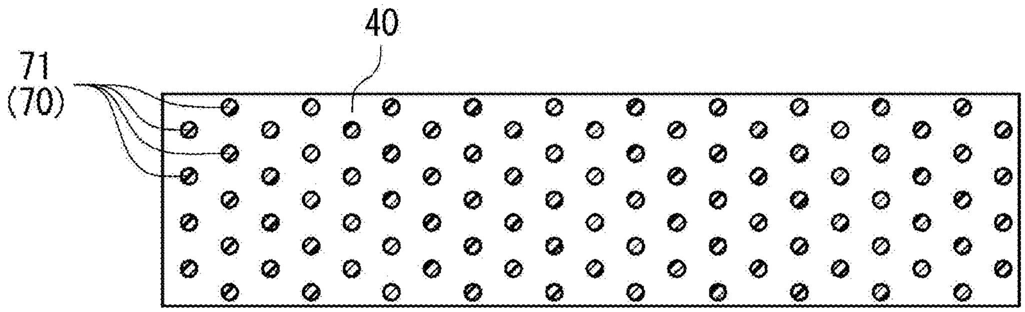
FIG. 7 Prior Art
FIG. 7 is a plan view schematically illustrating an example of a negative electrode unit (spacer) included in a conventional lithium secondary battery.
Figure 8:
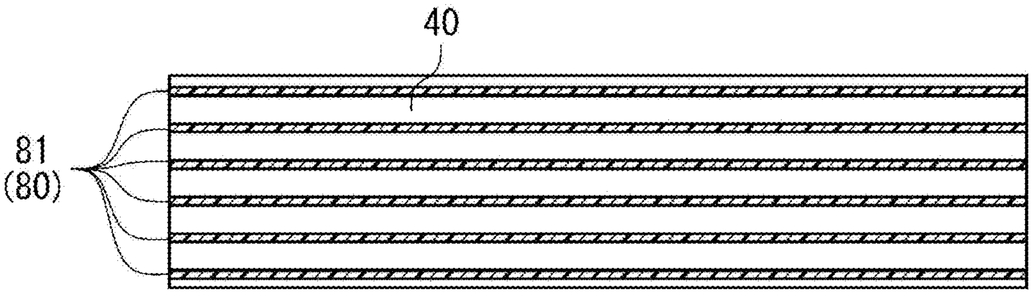
FIG. 8 Prior Art
FIG. 8 is a plan view schematically illustrating another example of a negative electrode unit (spacer) included in a conventional lithium secondary battery.
Figure 9:
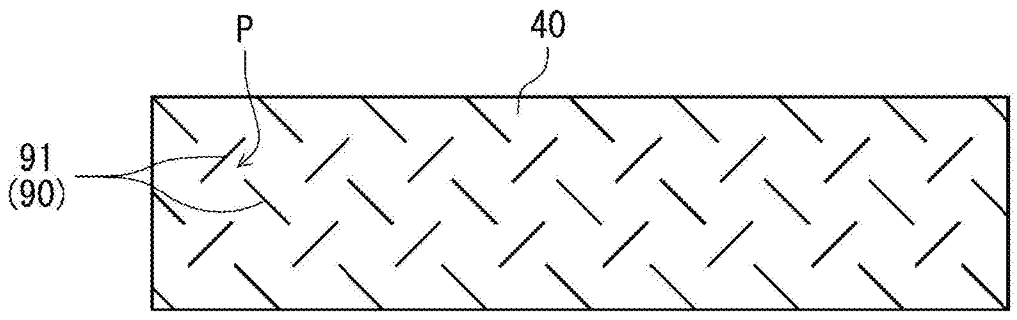
FIG. 9 Prior Art
FIG. 9 is a plan view schematically illustrating yet another example of a negative electrode unit (spacer) included in a conventional lithium secondary battery.

Examples of the spacer included in a conventional lithium secondary battery are a spacer 70 as shown in FIG. 7, a spacer 80 as shown in FIG. 8, and a spacer 90 as shown in FIG. 9. The spacer 70 shown in FIG. 7 is formed by disposing a plurality of spotted projected portions 71 in a scattered manner. The spacer 80 shown in FIG. 8 is formed by disposing a plurality of lined projected portions 81 (linear projected portions) in a parallel manner. The spacer 90 shown in FIG. 9 is formed by disposing a plurality of lined projected portions 91 (linear projected portions) in different directions in an alternate manner.

In the spacers of FIGS. 7 to 9, a plurality of projected portions are disposed each independently and noncontinuously, and therefore a region where a space (distance) between the negative electrode and the separator is small is generated locally, which makes the space between the negative electrode and the separator nonuniform. In particular, with the case of the spotted projected portions of FIG. 7, such a region tends to form. The nonuniform space between the negative electrode and the separator may locally increase the pressure applied to the electrode at the time of the lithium metal deposition.

Lithium metal tends to deposit at the peripheral rim of the side face of the projected portions. Meanwhile, with the spacers of FIGS. 7 to 9, the plurality of projected portions are disposed each independently, and gaps are present between the projected portions next to each other. For example, with the case of the spacer 90 as shown in FIG. 9, a gap P is present between the lined projected portions 91 next to each other. The minimum distance between the lined projected portions 91 at the gap P is, for example, 1 mm or more and 5 mm or less. Between the above-described gap, the lithium metal deposits sparsely, causing nonuniform lithium metal deposition, and the pressure applied to the electrode may increase locally.

Also, with the case of the spacer 80 as shown in FIG. 8, the plurality of lined projected portions 80 are disposed in parallel to each other along the longitudinal direction of the strip negative electrode 40, and lithium metal tends to deposit along the longitudinal direction of the negative electrode 40. Thus, the lithium metal deposition becomes nonuniform between the longitudinal direction and the width direction of the negative electrode 40, and the pressure applied to the electrode may increase locally.

In contrast, with the lithium secondary battery of the embodiment of the present disclosure, the spacer has a net structure formed with a plurality of lined projected portions, which suppresses local increase in the pressure applied to the electrode at the time of lithium metal deposition and reduction in cycle characteristics.

In the present disclosure, a net with a plurality of grids surrounded by a plurality of lined projected portions is formed. Thus, the space is easily formed uniformly and stably between the negative electrode and the separator, and local increase in the pressure applied to the electrode at the time of lithium metal deposition based on nonuniform space is suppressed. Uniform formation of the space between the negative electrode and the separator means that the distance between the negative electrode and the separator is ensured to be constant.

In the present disclosure, a plurality of lined projected portions are disposed continuously. That is, the lined projected portions next to each other are substantially connected. In this manner, a net structure is formed. Thus, nonuniform lithium metal deposition when gaps (e.g., a gap P shown in FIG. 9) are present between the lined projected portions next to each other is suppressed, and local increase in the pressure applied to the electrode based on the nonuniform lithium metal deposition is suppressed. Here. "the lined projected portions next to each other are substantially connected" includes not only a case where lined projected portions next to each other are actually connected, but also a case where lined projected portions next to each other are slightly spaced apart (e.g., slightly spaced apart by a minimum distance of 0.1 mm or less). With the above-described slight distance, the effects on the lithium metal deposition form are almost none.

With the present disclosure, a plurality of lined projected portions are disposed to spread like a net at the negative electrode surface, and therefore the nonuniform lithium metal deposition when the spacer is in the shape as shown in FIG. 8 is suppressed, and local increase in the pressure applied to the electrode based on nonuniform lithium metal deposition is suppressed.

The lined projected portions may be linear projected portions, curved projected portions, or projected portions including the linear portion and the curved portion. The spacer may be configured with a type of lined projected portions, or with a combination of two or more types of lined projected portions. For example, a polygonal net may be configured with a plurality of linear projected portions. At least a portion of the plurality of lined projected portions may have a small slit with a width of 0.1 mm or less. The effects on lithium metal deposition form from the presence of the above-described small slit is almost none.

Preferably, the plurality of lined projected portions are configured integrally. The net structure may have a connection portion connecting end portions of three or more lined projected portions next to each other. Preferably, the net structure is disposed regularly. For example, a plurality of polygons are regularly disposed to configure the net. In the above-described case, nonuniform space between the negative electrode and the separator, nonuniform lithium metal deposition, and nonuniform pressure applied to the electrode at the time of lithium metal deposition are easily suppressed.

In view of improvement in flowability of the non-aqueous electrolyte at the negative electrode surface, the height of a portion of the lined projected portions may be different from the height of the remaining portion of the lined projected portions, or the height of the lined projected portions next to each other may be different. A plurality of lined projected portions may include lined projected portions with a height h1, and lined projected portions with a height h2 smaller than the height h1. In this case, the ratio of the height h2 relative to the height h1:h2/h1 may be, for example, 0.8 or more and less than 1.0, or 0.8 or more and 0.95 or less.

In view of ensuring the least space necessary between the negative electrode and the separator, the average height h of the lined projected portions may be, depending on the battery size, 0.02 mm or more and 0.09 mm or less, or 0.015 mm or more and 0.01 mm or less. The average height h of the lined projected portions is determined by averaging values measured at any ten points.

The width of the plurality of lined projected portions (width W of lined projected portions 51 in FIG. 5) may be 1 mm or less, or 0.1 mm or more and 1 mm or less. In this case, the space between the negative electrode and the separator is formed stably, and the effects on battery performance from the coverage of the negative electrode surface with the lined projected portions can be minimized.

In view of suppressing the lithium metal deposition at surfaces of the lined projected portions, the plurality of lined projected portions may be constituted of a material with a lower electrical conductivity than that of the negative electrode, or may be constituted of a resin material.

When the shape of the net is a polygon, the polygon may be a hexagon. In view of suppressing nonuniform space between the negative electrode and the separator, the polygon may have an internal angle of 120° or less.

In view of easily forming the space between the negative electrode and the separator with the spacer stably and uniformly, the net may have an opening area of, per one net, 3.5 $mm^2$ or less, or 1.0 $mm^2$ or more and 3.5 $mm^2$ or less. When the net has an opening area of 1.0 $mm^2$ or more per one net, the space for lithium metal to deposit is ensured sufficiently.

The ratio of the area covered with the spacer on the negative electrode surface relative to the negative electrode surface area (hereinafter, referred to as a coverage of the negative electrode surface with the spacer) may be 21% or less, 0.2% or more and 21% or less, or 1% or more and 21% or less. When the coverage of the negative electrode surface with the spacer is 21% or less, the effects on battery performance from the covering of the negative electrode surface with the spacer can be minimized. When the coverage of the negative electrode surface with the spacer is 0.2% or more (or 1% or more), the space between the negative electrode and the separator is stabilized and easily formed uniformly.

The negative electrode may have a first surface, and a second surface at an opposite side of the first surface. In this case, the separator may include a first separator disposed at the first surface side, and a second separator disposed at the second surface side. The spacer may include a first spacer disposed between the negative electrode and the first separator, and a second spacer disposed between the negative electrode and the second separator. A plurality of lined projected portions include a plurality of first lined projected portions, and a plurality of second lined projected portions, and the first spacer has a net structure formed with the plurality of first lined projected portions, and the second spacer may have a net structure formed with the plurality of second lined projected portions.

Preferably, when seen from the normal direction of the first surface, the ratio of the area where the first spacer overlaps the second spacer relative to the first spacer area is small. Preferably, the first spacer and the second spacer are provided so that the plurality of first lined projected portions and the plurality of second lined projected portions cross each other, or do not overlap each other, when seen from the normal direction of the first surface. When the first lined projected portions and the second lined projected portions each crosses as linear projected portions, the angle (angle of 90° or less) formed by crossing of the first lined projected portions and the second lined projected portions may be, for example, 20° or more, or 40° or more.

Lithium metal tends to deposit at the peripheral rim of side faces of the projected portions. Also, the lithium metal may deposit at the surface of the projected portions, and in the region between the projected portions and the separator. Therefore, based on the lithium metal deposition, the negative electrode thickness near the projected portions easily becomes large locally. Thus, by disposing the first spacer and the second spacer so that the area of the portion where the first spacer overlaps the second spacer is small (e.g., the first lined projected portions and the second lined projected portions cross each other, or not to overlap) when seen from the normal direction of the first surface, local expansion of the negative electrode is suppressed.

In the present disclosure, when the electrode group is a wound type. "seen from the normal direction of the surface" means seeing from the normal direction in a state where the surface is extended in a flat state. Thus, "the projected portions overlap the projected portions" does not include a case where the projected portions overlap the projected portions by winding.

The lithium secondary battery may include a laminate type electrode group configured by laminating the positive electrode and the negative electrode with the separator interposed therebetween, or a wound type electrode group configured by winding the positive electrode and the negative electrode with the separator interposed therebetween into a spiral shape.

In the following, each of the elements of the lithium secondary battery is described further in detail.

[Negative Electrode]

The negative electrode includes a negative electrode current collector. In lithium secondary batteries, a lithium metal deposits on the negative electrode current collector surface by charging. More specifically, lithium ions included in the non-aqueous electrolyte become a lithium metal by receiving electrons on the negative electrode current collector by charging, and deposits on the negative electrode current collector surface. The lithium metal deposited on the negative electrode current collector surface dissolves as lithium ions into the non-aqueous electrolyte by discharging. The lithium ion included in the non-aqueous electrolyte may be derived from a lithium salt added to the non-aqueous electrolyte, may be supplied from the positive electrode active material by charging, or both.

The negative electrode current collector may be a conductive sheet. Examples of the conductive sheet include a foil and a film.

The conductive sheet surface may be smooth. In this manner, the lithium metal derived from the positive electrode easily deposits on the conductive sheet uniformly. Smooth means that the conductive sheet has a maximum height roughness Rz of 20 μm or less. The conductive sheet may have a maximum height roughness Rz of 10 μm or less. The maximum height roughness Rz is measured in accordance with JIS B 0601:2013.

The material of the negative electrode current collector (conductive sheet) may be a conductive material other than lithium metal and a lithium alloy. The conductive material may be metal, or a metal material such as an alloy. Preferably, the conductive material is a material that does not react with lithium. More specifically, a material that does not form an alloy or intermetallic compound with lithium is preferably used. Such a conductive material is, for example, copper (Cu), nickel (Ni), iron (Fe), and an alloy including these metal elements, or graphite with its basal plane exposed with priority. Examples of the alloy include copper alloy and stainless steel (SUS). Preferably, in particular, copper and/or a copper alloy having a high electrical conductivity is used.

The negative electrode current collector has a thickness of, without particular limitation, for example, 5 μm or more and 300 μm or less.

On the surface of the negative electrode current collector, a negative electrode mixture layer may be formed. The negative electrode mixture layer is formed, for example, by applying a paste including a negative electrode active material such as graphite on at least a portion of a surface of the negative electrode current collector. However, in view of achieving a lithium secondary battery having a high capacity exceeding lithium ion batteries, the thickness of the negative electrode mixture layer is set to be sufficiently thin so as to allow lithium metal to deposit on the negative electrode.

[Spacer]

The material composing the spacer is not particularly limited. The spacer may be constituted of a conductive material and/or an insulating material. The spacer may be provided on the surface of the negative electrode, or on the surface of the separator (surface facing the negative electrode).

The conductive material can be selected suitably from those given as examples for a material of the negative electrode current collector. Such a spacer can be provided by forming projected portions on the negative electrode current collector by pressing and the like. Also, a conductive coating material may be applied on a surface of the negative electrode, or a conductive tape can be attached to a surface of the negative electrode.

Examples of the insulating material include a resin material. Examples of the resin material include polyolefin resin, acrylic resin, polyamide resin, polyimide resin, silicone resin, and fluorine resin. A cured product of a curable resin such as epoxy resin may also be used. Furthermore, these resin materials may be mixed with an inorganic filler and the like. The spacer can be formed by attaching, for example, a resin-made adhesive tape to a surface of the negative electrode. The spacer may be formed by applying a solution or a dispersion liquid including a resin material on a surface of the negative electrode or a surface of the separator facing the negative electrode, and drying. The spacer may be formed by applying a curable resin on a surface of the negative electrode or a surface of the separator facing the negative electrode with a desired shape, and curing.

[Positive Electrode]

The positive electrode includes, for example, a positive electrode current collector, and a positive electrode mixture layer supported on the positive electrode current collector. The positive electrode mixture layer includes, for example, a positive electrode active material, a conductive material, and a binder. The positive electrode mixture layer may be formed on only one surface of the positive electrode current collector, or on both surfaces. The positive electrode is produced by, for example, applying a positive electrode mixture slurry including a positive electrode active material, a conductive agent, and a binder onto both sides of the positive electrode current collector, drying the applied coating, and then rolling.

The positive electrode active material is a material that stores and releases lithium ions. Examples of the positive electrode active material include a lithium-containing transition metal oxide, transition metal fluoride, polyanion, fluorinated polyanion, and transition metal sulfide. In particular, the lithium-containing transition metal oxide is preferable in terms of low production costs, and a high average discharge voltage.

Examples of the transition metal element included in the lithium-containing transition metal oxide include Sc, Ti, V, Cr, Mn, Fe, Co, Ni, Cu, Y, Zr, and W. The lithium-containing transition metal oxide may contain one kind or two or more kinds of transition metal element. The transition metal element may be Co, Ni, and/or Mn. The lithium-containing transition metal oxide may include, as necessary, one or more main group elements. Examples of the main group element include Mg, Al, Ca, Zn, Ga, Ge, Sn, Sb, Pb, and Bi. The main group element may be Al.

Of the lithium-containing transition metal oxide, a composite oxide including Co, Ni and/or Mn as a transition metal element, optionally including Al, and having a layered rock salt type crystal structure is preferable in terms of obtaining a high capacity. In this case, in the lithium secondary battery, a molar ratio: mLi/mM is set to, for example, 1.1 or less, mLi being a total amount of lithium included in the positive electrode and the negative electrode, and mM being an amount of metal M other than lithium included in the positive electrode.

The conductive material is, for example, a carbon material. Examples of the carbon material include carbon black, acetylene black. Ketjen Black, carbon nanotube, and graphite.

Examples of the binder include fluororesin, polyacrylonitrile, polyimide resin, acrylic resin, polyolefin resin, and a rubber polymer. Examples of the fluororesin include polytetrafluoroethylene and polyvinylidene fluoride.

The positive electrode current collector may be a conductive sheet. Examples of the conductive sheet include a foil and a film. A carbon material may be applied on a surface of the positive electrode current collector.

Examples of the material of the positive electrode current collector (conductive sheet) include a metal material including Al, Ti, or Fe. The metal material may be Al, an Al alloy, Ti, a Ti alloy, and an Fe alloy. The Fe alloy may be stainless steel (SUS).

The thickness of the positive electrode current collector is not particularly limited and is, for example, 5 μm or more and 300 μm or less.

[Separator]

For the separator, a porous sheet having ion permeability and insulating properties is used. Examples of the porous sheet include a microporous thin film, woven fabric, and nonwoven fabric. The material of the separator may not be particularly limited, and may be a polymer material. Examples of the polymer material include olefin resin, polyamide resin, and cellulose. Examples of the olefin resin include polyethylene, polypropylene, and a copolymer of ethylene and propylene. The separator may include, as necessary, an additive. Examples of the additive include an inorganic filler.

[Non-Aqueous Electrolyte]

The non-aqueous electrolyte having a lithium ion conductivity include, for example, a non-aqueous solvent, and lithium ions and anions dissolved in the non-aqueous solvent. The non-aqueous electrolyte may be liquid or gel.

The liquid non-aqueous electrolyte is prepared by dissolving a lithium salt in a non-aqueous solvent. By dissolving the lithium salt in a non-aqueous solvent, lithium ions and anions are generated.

The gel non-aqueous electrolyte includes a lithium salt and a matrix polymer, or a lithium salt, a non-aqueous solvent, and a matrix polymer. As the matrix polymer, for example, a polymer material which absorbs the non-aqueous solvent and forms gel is used. Examples of the polymer material include fluororesin, acrylic resin, and polyether resin.

As the lithium salt or anion, for example, a known one used in a non-aqueous electrolyte of lithium secondary batteries can be used. Specifically, $BF_4$—, $ClO_4$—, $PF_6$—, $CF_3SO_3$—, $CF_3CO_2$—, anions of imides, and anions of an oxalate complex are used. Examples of the anions of imides include $N(SO_2CF_3)_2$—, and $N(C_mF_{2m+1}SO_2)_x(C_nF_{2n+1}SO_2)_y$-(m and n are each independently an integer of 0 or 1 or more, x and y are each independently 0, 1, or 2, and satisfy x+y=2). The anions of an oxalate complex may contain boron and/or phosphorus. Examples of the anions of the oxalate complex include bisoxalate borate anion, $BF_2(C_2O_4)$—, $PF_4(C_2O_4)$—, and $PF_2(C_2O_4)_2$—. The non-aqueous electrolyte may contain one kind of anion, and may contain two or more kinds.

Preferably, in view of suppressing dendritic deposition of lithium metal, the non-aqueous electrolyte includes at least an anion of the oxalate complex. The interaction between the anion of the oxalate complex and lithium allows for deposition of lithium metal with fine particles homogeneously. Therefore, local deposition of lithium metal can be easily suppressed. The anion of the oxalate complex can be combined with other anions. Other anions may be $PF_6^-$ and/or anions of imides.

Examples of the non-aqueous solvent include esters, ethers, nitriles, amides, or halogen substitutes thereof. The non-aqueous electrolyte may contain one kind of non-aqueous solvent, or may contain two or more kinds. Examples of the halogen substitutes include fluoride.

Examples of the ester include carbonate and carboxylate. Examples of the cyclic carbonate include ethylene carbonate, propylene carbonate, and fluoro ethylene carbonate (FEC). Examples of the chain carbonate include dimethyl carbonate (DMC), ethyl methyl carbonate (EMC), and diethyl carbonate. Examples of the cyclic carboxylate include γ-butyrolactone and γ-valerolactone. Examples of the chain carboxylate include ethyl acetate, methyl propionate, and methyl fluoropropionate.

Ethers include cyclic ether and chain ether. Examples of the cyclic ether include 1,3-dioxolane, 4-methyl-1,3-dioxolane, tetrahydrofuran, and 2-methyltetrahydrofuran. Chain ethers include 1,2-dimethoxyethane, diethyl ether, ethyl vinyl ether, methyl phenyl ether, benzyl ethyl ether, diphenyl ether, dibenzyl ether, 1,2-diethoxyethane, diethylene glycol dimethyl ether, and the like.

The concentration of the lithium salt in the non-aqueous electrolyte may be, for example, 0.5 mol/L or more and 3.5 mol/L or less. The concentration of the anion in the non-aqueous electrolyte may be 0.5 mol/L or more and 3.5 mol/L or less. The concentration of the anion of the oxalate complex in the non-aqueous electrolyte may be 0.05 mol/L or more and 1 mol/L or less.

The non-aqueous electrolyte may include an additive. The additive may be an additive that forms a coating on the negative electrode. By forming a coating derived from the additive on the negative electrode, dendrite generation is easily suppressed. Examples of such an additive include vinylene carbonate, FEC, and vinyl ethyl carbonate (VEC).

In the following, a configuration of the lithium secondary battery of the present disclosure is described with reference to the drawings using a cylindrical battery including a wound electrode group as an example. However, the present disclosure is not limited to the configuration below.

Figure 1:
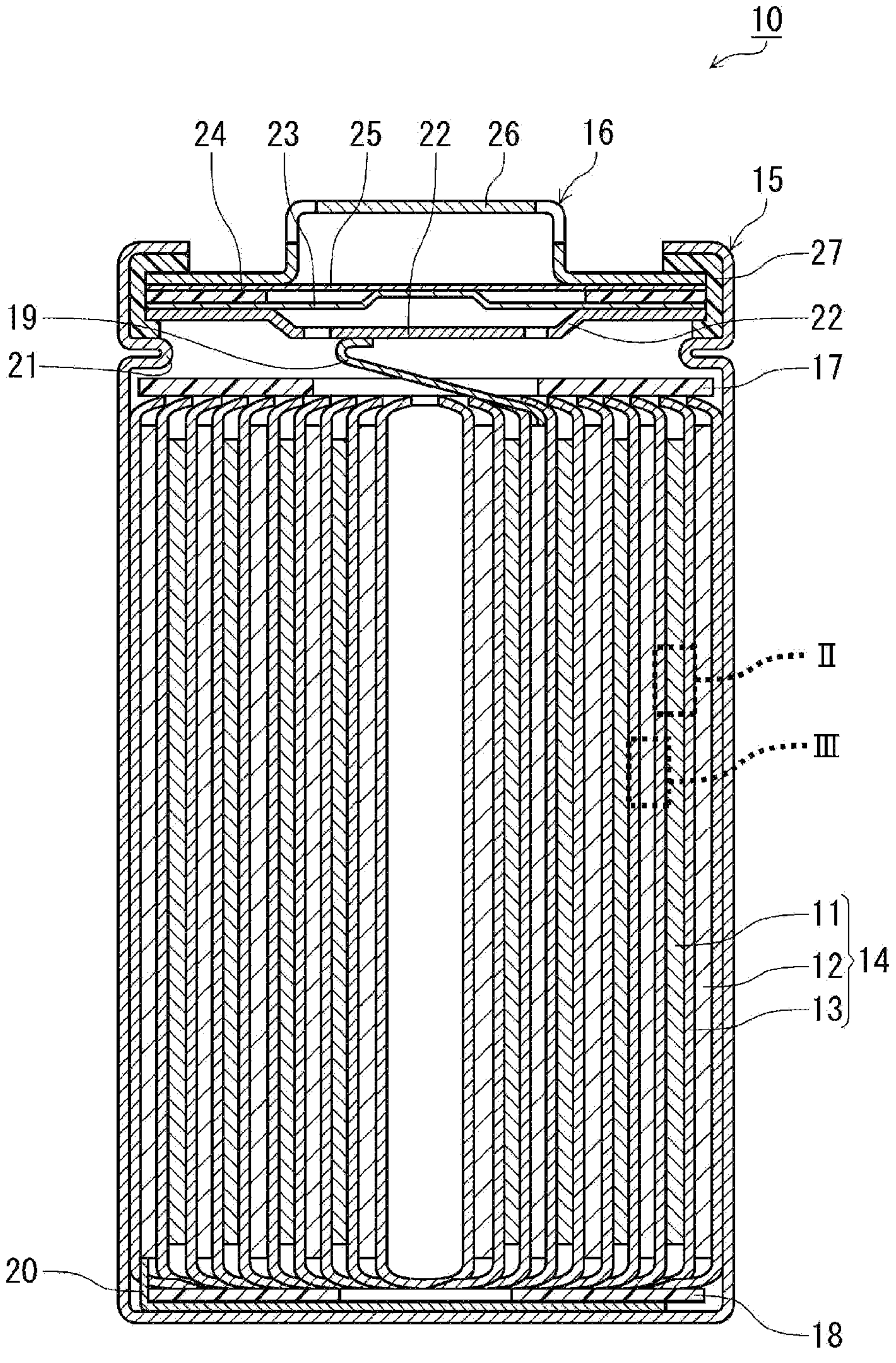
FIG. 1 is a vertical cross sectional view schematically illustrating an example of a lithium secondary battery of an embodiment of the present disclosure.
Figure 2:
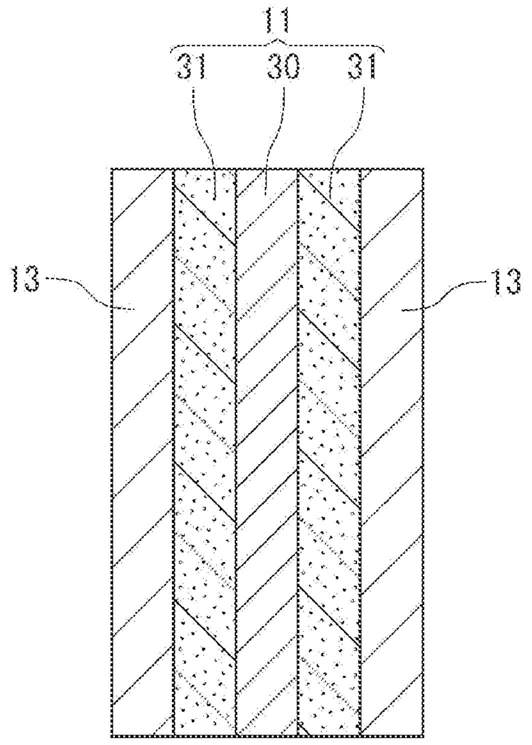
FIG. 2 is a cross sectional view schematically illustrating a configuration of a positive electrode of FIG. 1.
Figure 3:
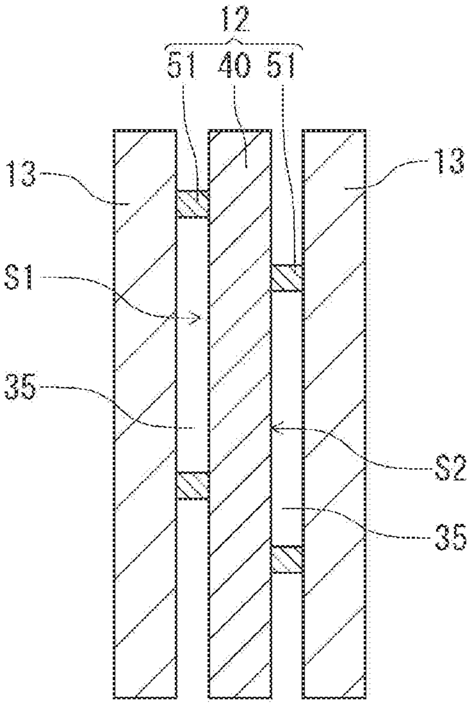
FIG. 3 is a cross sectional view schematically illustrating a configuration of a negative electrode unit of FIG. 1.
Figure 4:
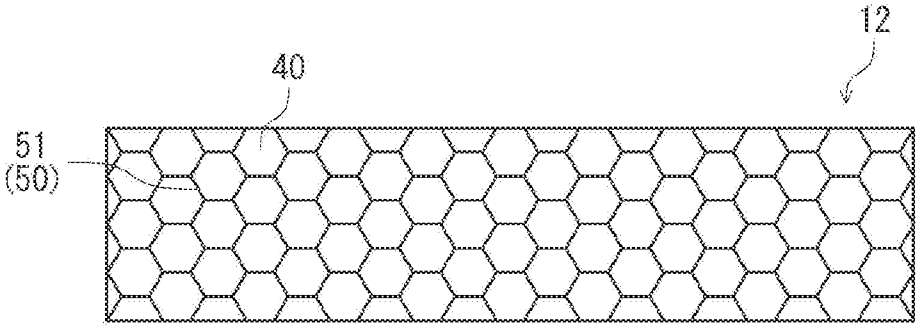
FIG. 4 is a plan view schematically illustrating an example of the negative electrode unit included in the lithium secondary battery of FIG. 1.
Figure 5:
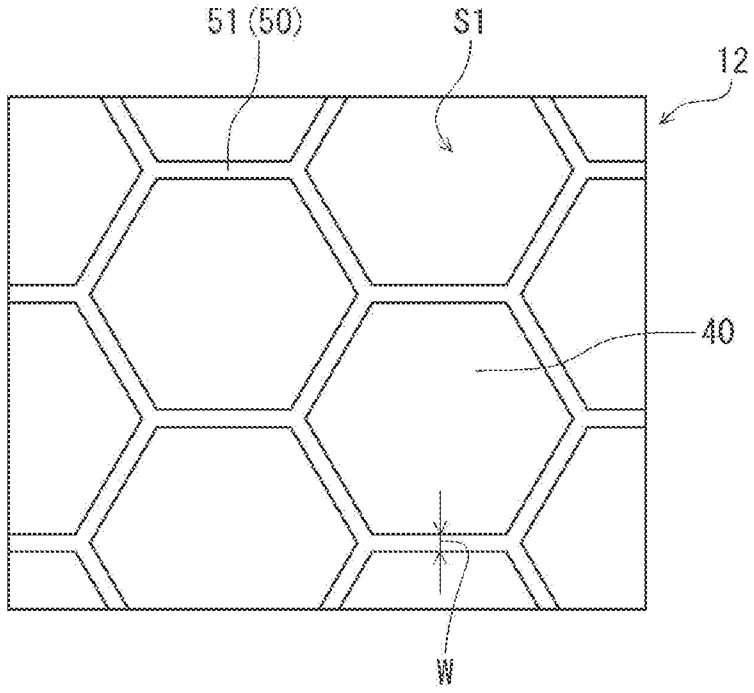
FIG. 5 is a partially enlarged plan view of the negative electrode unit of FIG. 4.
Figure 6:
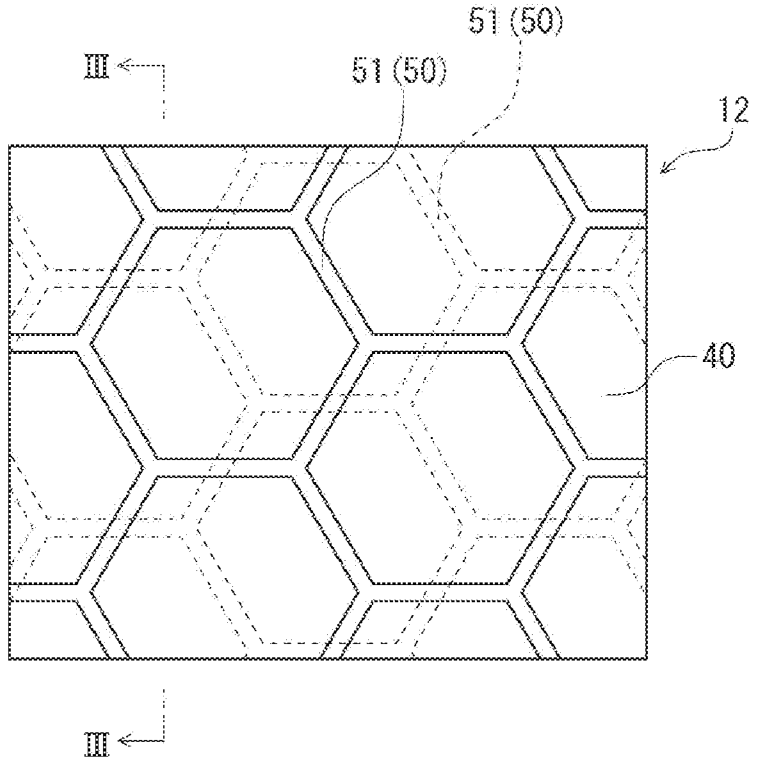
FIG. 6 further shows a position of the spacer provided on a rear face of the negative electrode in FIG. 5.

FIG. 1 is a vertical cross sectional view schematically illustrating an example of a lithium secondary battery of the embodiment of the present disclosure. FIG. 2 is a cross sectional view schematically illustrating a configuration of the positive electrode of FIG. 1, which is an enlarged view of the portion encircled with the region II in FIG. 1. FIG. 3 is a cross sectional view schematically illustrating a configuration of a negative electrode unit in FIG. 1, which is an enlarged view of the portion encircled with the region III of FIG. 1. The cross section of the negative electrode unit in FIG. 3 is also a cross section in III-III direction of FIG. 6. FIG. 4 is a plan view schematically illustrating an example of the negative electrode unit included in the lithium secondary battery of FIG. 1. FIG. 5 is an enlarged view of a portion of the negative electrode unit in FIG. 4. FIG. 6 further shows a position of the spacer provided on a rear face of the negative electrode in FIG. 5.

A lithium secondary battery 10 is a cylindrical battery including a cylindrical battery case, a wound electrode group 14 accommodated in a battery case, and a non-aqueous electrolyte, which is not shown. The battery case is configured with a case main body 15, which is a bottomed cylindrical metal-made vessel, and a sealing body 16 that seals an opening of the case main body 15. Between the case main body 15 and the sealing body 16, a gasket 27 is disposed, and sealing properties of the battery case are ensured in this manner. In the case main body 15, insulating plates 17 and 18 are disposed at both end portions in the winding axis direction of the electrode group 14.

The case main body 15 has, for example, a step portion 21 formed by pressing the side wall partially from outside of the case main body 15. The step portion 21 may be formed to be a ring along the circumferential direction of the case main body 15 along the side wall of the case main body 15. In this case, the sealing body 16 is supported at a face of the opening side of the step portion 21.

The sealing body 16 includes a filter 22, a lower valve 23, an insulating member 24, an upper valve 25, and a cap 26. In the sealing body 16, these members are laminated in this order. The sealing body 16 is attached to an opening of the case main body 15 so that the cap 26 is positioned outside of the case main body 15, and the filter 22 is positioned inside the case main body 15. Each of the above-described members constituting the sealing body 16 is, for example, a disk shape or a ring shape. The lower valve 23 and the upper valve 25 are connected to each other at their center portions, and the insulating member 24 is interposed between their peripheral rims. The filter 22 and the lower valve 23 are connected to each other at their center portions. The upper valve 25 and the cap 26 are connected to each other at their center portions. That is, each of the members excluding the insulating member 24 is electrically connected to each other.

A ventilation hole, which is not shown, is formed at the lower valve 23. Therefore, when the internal pressure of the battery case increases by abnormal heat generation and the like, the upper valve 25 bulges to the cap 26 side to be spaced apart from the lower valve 23. In this manner, the electrical connection between the lower valve 23 and the upper valve 25 is shut down. Furthermore, when the internal pressure increases, the upper valve 25 breaks and gas is released from the opening, which is not shown, formed in the cap 26.

The electrode group 14 has a positive electrode 11, a negative electrode unit 12, and a separator 13. The positive electrode 11, the negative electrode unit 12, and the separator 13 are all strips. The positive electrode 11 and the negative electrode unit 12 are wound into a spiral shape with the separator 13 interposed therebetween so that the width direction of the strip positive electrode 11 and the negative electrode unit 12 is in parallel with the winding axis. At a cross section vertical to the winding axis of the electrode group 14, the positive electrode 11 and the negative electrode unit 12 are laminated with the separator 13 interposed therebetween, alternately in the radial direction of the electrode group 14. That is, the longitudinal direction of each of the electrodes is a winding direction, and the width direction of each of the electrodes is an axis direction.

The positive electrode 11 is electrically connected with the cap 26 also serving as a positive electrode terminal through a positive electrode lead 19. An end portion of the positive electrode lead 19 is connected to, for example, around a center in the longitudinal direction of the positive electrode 11. The positive electrode lead 19 led from the positive electrode 11 extends to the filter 22 via a through hole, which is not shown, formed in the insulating plate 17. The other end of the positive electrode lead 19 is welded to the surface of the filter 22 at the electrode group 14 side.

The positive electrode 11 includes a positive electrode current collector 30 and a positive electrode mixture layer 31 (ref: FIG. 2), and is electrically connected with the cap 26 serving as a positive electrode terminal through the positive electrode lead 19. An end of the positive electrode lead 19 is connected to, for example, around a center in the longitudinal direction of the positive electrode 11. The positive electrode lead 19 led from the positive electrode 11 extends to the filter 22 via a through hole, which is not shown, formed in the insulating plate 17. The other end of the positive electrode lead 19 is welded to the surface of the filter 22 at the electrode group 14 side.

As shown in FIG. 3 and FIG. 4, the negative electrode unit 12 includes a strip negative electrode 40, and the negative electrode 40 has a first surface S1 and a second surface S2 at an opposite side of the first surface S1. The negative electrode 40 includes at least a strip negative electrode current collector, and may include a strip negative electrode current collector, and a negative electrode mixture layer formed on both sides of the negative electrode current collector. The negative electrode current collector of the negative electrode 40 is electrically connected to a case main body 15 also functions as a negative electrode terminal through the negative electrode lead 20. An end of the negative electrode lead 20 is connected to, for example, an end portion of the negative electrode current collector of the negative electrode 40 in the longitudinal direction, and the other end is welded to an inner bottom portion of the case main body 15.

As shown in FIG. 3 and FIG. 4, the negative electrode unit 12 includes a spacer 50 (lined projected portions 51) provided on the first surface S1 and the second surface S2 of the negative electrode 40. As shown in FIG. 4 to FIG. 6, the spacer 50 has a net structure (honeycomb structure) formed with the plurality of lined projected portions 51. By connecting six lined projected portions 51 (linear projected portions), a hexagon net is formed. As shown in FIG. 3, the presence of the plurality of lined projected portions 51 forms a space 35 between the first surface S1 and the separator 13, and between the second surface S2 and the separator 13.

In the lithium secondary battery 10, by charging, a lithium metal deposits in the space 35 on the negative electrode 40, and the deposited lithium metal dissolves in the non-aqueous electrolyte by discharging. By accommodating the lithium metal deposited on the negative electrode surface in the space 35, the pressure applied to the electrode by deposition of the lithium metal is reduced, and the electrode damage due to the increase in the pressure is suppressed.

As shown in FIG. 6, when seen from the normal direction of the first surface S1, the spacer 50 (the spacer 50 shown in broken lines in FIG. 6) provided on the second surface S2 of the negative electrode 40 is disposed so as not to coincide with the spacer 50 (the spacer 50 shown in solid line in FIG. 6) provided on the first surface S1 of the negative electrode 40. When seen in the normal direction of the first surface S1, a portion of the plurality of lined projected portions 51 (two of the six lined projected portions 51 forming the hexagon net) provided on the first surface S1 does not overlap with the lined projected portions 51 provided on the second surface S2. The remaining portion of the plurality of lined projected portions 51 (four of the six lined projected portions 51 forming the hexagon net) provided on the first surface S1 cross the lined projected portions 51 provided on the second surface S2. The ratio by which the area covered with the spacer of the first surface S1 overlaps the area covered with the spacer of the second surface S2 may be 30% or less, or 15% or less of the area covered with the spacer of the first surface S1 (area covered with the spacer of the second surface S2).

In the illustrated example, a cylindrical lithium secondary battery including a wound-type electrode group has been described, but the present embodiment is not limited to this case and can be applied to other cases. The shape of the lithium secondary battery can be appropriately selected from various shapes depending on the application, and can be, in addition to the cylindrical shape, a coin-type, a prism-type, a sheet-type, and a flat-type. The form of the electrode group is not particularly limited as well, and may be a laminate type. In addition, other than the electrode group and the non-aqueous electrolyte of the lithium secondary battery, a known structure can be used without any particular limitation.

EXAMPLES

The lithium secondary battery of the present disclosure will be described in detail below with reference to Examples and Comparative Examples. The present disclosure, however, is not limited to the following Examples.

Example 1

(1) Positive Electrode Production

A rock salt type lithium-containing transition metal oxide (NCA; positive electrode active material) containing Li, Ni, Co, and Al (molar ratio of Li relative to a total of Ni, Co, and Al is 1.0) and having a layer structure, acetylene black (AB; conductive material), and polyvinylidene fluoride (PVdF; binder) are mixed at a mass ratio of NCA:AB:PVdF=95:2.5:2.5, and further N-methyl-2-pyrrolidone (NMP) was added in a suitable amount, and the mixture was stirred, thereby preparing a positive electrode mixture slurry. Then, the produced positive electrode mixture slurry was applied onto both surfaces of an Al foil (positive electrode current collector), and dried, and the coating of the positive electrode mixture was rolled using a roller. Lastly, a laminate of the produced positive electrode current collector and the positive electrode mixture was cut into a predetermined electrode size, thereby producing a positive electrode including the positive electrode mixture layer on both sides of the positive electrode current collector.

(2) Negative Electrode Unit Production

A rectangular electrolytic copper foil (thickness 12 μm) as a negative electrode (negative electrode current collector) was prepared. On one surface of the electrolytic copper foil, a polyimide ink was discharged using a dispenser, and thereafter, vacuum dried to produce a polyimide resin-made spacer having a shape shown in FIG. 4 (honeycomb structure).

Afterwards, on the other surface of the electrolytic copper foil, the same spacer as described above was produced in the same manner. At that time, positions of holes with a diameter of 0.8 mm formed at four corners of the electrolytic copper foil were checked with a CCD camera, and the position of the spacers to be provided were adjusted so that the spacers formed on both surfaces of the negative electrode were in the positional relation shown in FIG. 6. Then, the above-described electrolytic copper foil was cut into a predetermined electrode size. In this manner, a negative electrode unit including a strip negative electrode, and a spacer having a net structure disposed at each surface of the negative electrode was produced. The electrolytic copper foil cut into an electrode size had a width 65 mm, and a longitudinal direction length of 1000 mm.

The shape of the net of the spacer was an equilateral hexagon. The lined projected portions had a height of 0.03 mm. The length of the lined projected portions forming a side of the equilateral hexagon net was 1.156 mm. The lined projected portions had a width of 0.25 mm. The ratio of the area covered with the spacer of the negative electrode surface (one side) relative to the area of the negative electrode surface (one side) (coverage of the negative electrode surface with the spacer) was 21%. The opening area of the net per one net was 3.46 $mm^2$.

(3) Non-Aqueous Electrolyte Preparation

EC and DMC were mixed with a volume ratio of EC:DMC=30:70. To the produced solvent mixture, $LiPF_6$ and $LiBF_2(C_2O_4)$ were dissolved so as to achieve a 1 mol/L of $LiPF_6$ and 0.1 mol/L $LiBF_2(C_2O_4)$, thereby preparing a liquid non-aqueous electrolyte.

(4) Battery Production

A tab made of Al was attached to the positive electrode obtained above. A tab made of Ni was attached to the negative electrode current collector of the negative electrode unit obtained as described above. In an inert gas atmosphere, the positive electrode and the negative electrode were wound with the separator interposed therebetween into a spiral shape, thereby producing a wound electrode group. All the lithium included in the electrode group was derived from the positive electrode, and therefore the molar ratio: mLi/mM of a total amount of lithium mLi included in the positive electrode and the negative electrode and an amount of metal M included in the positive electrode (here, Ni, Co, and Al) mM was 1.0. A polyethylene-made microporous film was used for the separator. The obtained electrode group was accommodated in a bag-like outer package formed of a laminated sheet having an Al layer, and after the above-mentioned non-aqueous electrolyte was injected into the outer package in which the electrode group was accommodated, the outer package was sealed to produce a lithium secondary battery A1.

Example 2

In the production of the negative electrode unit of the above-described (2), the length of a side of the equilateral hexagon net forming the lined projected portions was set to 2.887 mm. The width of the lined projected portions was set to 1 mm. A lithium secondary battery A2 was prepared in the same manner as in Example 1, except for the above.

The ratio of the area covered with the spacer of the negative electrode surface (one side) relative to the area of the negative electrode surface (one side) (coverage of the negative electrode surface with the spacer) was 30.6%. The opening area of the net per one net was 21.65 $mm^2$.

Comparative Example 1

In the production of the negative electrode unit of the above-described (2), the spacer having a shape as shown in FIG. 8 was provided on both surfaces of the negative electrode. The spacer was provided by applying a polyimide ink on both surfaces of the negative electrode along the longitudinal direction of the strip negative electrode, and thereafter, drying with hot air, thereby forming six lined projected portions parallel to each other. The lined projected portions had a height of 0.03 mm and a width of 1 mm, and the interval between the lined projected portions next to each other was 5 mm. Seen from the normal direction on one surface of the negative electrode, the spacers provided on both surfaces of the negative electrode were disposed so as not to overlap with each other. A lithium secondary battery was made in the same manner as in Example 1, except for the above.

Comparative Example 2

In the production of the negative electrode unit of the above-described (2), a spacer having a shape as shown in FIG. 7 was provided on both surfaces of the negative electrode. The spacer was provided by applying a polyimide ink on both surfaces of the negative electrode in a spotted manner, and thereafter, drying with hot air, thereby forming spotted projected portions. The projected portions had a height of 0.03 mm, and a diameter of 1 mm, and the interval of the projected portions next to each other was 2.5 mm. Seen from the normal direction of one surface of the negative electrode, the spacers provided on both surfaces of the negative electrode were disposed so as not to overlap with each other. A lithium secondary battery was made in the same manner as in Example 1, except for the above.

[Evaluation 1]

The produced batteries were subjected to a charge and discharge test. In the charge and discharge test, the batteries were charged under the following conditions in a constant temperature bath at 25° C. then rested for 20 minutes, and discharged under the following conditions.

(Charging)

Constant current charging was performed at a current of 2.15 mA per electrode unit area (square centimeters) until the battery voltage reached 4.1 V, and thereafter, constant voltage charging was performed at a voltage of 4.1 V, until the electric current value per electrode unit area reached 0.54 mA.

(Discharging)

Constant current discharging was performed at a current of 2.15 mA per electrode unit area until the battery voltage reached 3.75 V.

The above-described charging and discharging were regarded as one cycle, and charge/discharge was performed to a 50th cycle. The ratio (%) of the 50th cycle discharge capacity relative to the 1st cycle discharge capacity was determined as a capacity retention rate. The discharge capacity of the 1st cycle was determined as an initial capacity.

The evaluation results are shown in Table 1. In Table 1, the initial capacity is shown as a relative value setting the initial capacity of the battery B1 as 100.

TABLE 1

| | Spacer | | Net opening area per one net (mm$^2$) | Coverage of negative electrode surface with spacer (%) | Initial capacity (relative value) | Capacity retention rate (%) |
|---|---|---|---|---|---|---|
| | Placed Position | Shape | | | | |
| A1 | Negative electrode surface | FIG. 4 (honeycomb) | 3.46 | 21.0 | 100 | 96.3 |
| A2 | Negative electrode surface | FIG. 4 (honeycomb) | 21.65 | 30.6 | 100 | 96.0 |
| B1 | Negative electrode surface | FIG. 8 (stripe) | — | 20.0 | 100 | 95.4 |
| B2 | Negative electrode surface | FIG. 7 (spot) | — | 12.6 | 100 | 95.3 |

The batteries A1 and A2 achieved a high capacity retention rate compared with the batteries B1 and B2.

Comparative Example 3

In the above-described secondary battery (electrode group) production (3), instead of using the negative electrode unit and the separator, a negative electrode current collector and a composite separator were used. Upon forming the electrode group, a surface of the composite separator where the spacer was provided was disposed to face the positive electrode to provide the spacer between the positive electrode and the separator.

The composite separator was produced by disposing the spacer (spacer having a shape shown in FIG. 8) of Comparative Example 1 on the surface of the separator facing the positive electrode. Specifically, a polymide ink was applied on the surface of the separator facing the positive electrode along the longitudinal direction of the strip separator, and thereafter, dried with hot air, thereby forming six lined projected portions parallel to each other. The height, the width, and the interval of the projected portions next to each other were set to be the same as those in the projected portions of Comparative Example 1. Seen from the normal direction of one surface of the positive electrode, the spacer provided on both surfaces of the positive electrode were disposed so as not to overlap with each other.

A secondary battery B3 was produced in the same manner as in Example, except for the above.

[Evaluation 2]

The batteries B1 and B3 were charged/discharged as described below in a constant temperature bath at 25° C.

(Charging)

Constant current charging was performed at a current of 2.15 mA per electrode unit area (square centimeters), until the battery voltage reached 4.1 V, and thereafter, constant voltage charging was performed at a voltage of 4.1 V until the electric current value per electrode unit area was 0.54 mA.

(Discharging)

After a 20 minutes rest, constant current discharge was performed at a current of 2.15 mA per electrode unit area until the battery voltage reached 3.0 V. The discharge capacity at this time was determined as an initial capacity.

The evaluation results are shown in Table 2. In Table 2, the initial capacity was shown as a relative value setting the initial capacity of the battery B1 as 100.

TABLE 2

| | Spacer | | Initial capacity (relative value) |
|---|---|---|---|
| | Placed Position | Shape | |
| B1 | Negative electrode surface | FIG. 8 (stripe) | 100 |
| B3 | Positive electrode surface | FIG. 8 (stripe) | 90.7 |

In the battery B3, in which the spacer was disposed between the positive electrode and the separator, the initial capacity decreased because during initial charging, lithium ions did not release smoothly from the positive electrode, compared with the battery B1, in which the spacer was disposed between the negative electrode and the separator.

INDUSTRIAL APPLICABILITY

The lithium secondary battery of the present disclosure can be used for mobile phones, smartphones, electronic devices such as tablet terminals, electric vehicles including hybrid and plug-in hybrid vehicles, and household storage batteries combined with solar batteries.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

10 lithium secondary battery
11 positive electrode
12 negative electrode unit
13 separator
14 electrode group
15 case main body
16 sealing body
17, 18 insulating plate
19 positive electrode lead

20 negative electrode lead
21 step portion
22 filter
23 lower valve
24 insulating member
25 upper valve
26 cap
27 gasket
30 positive electrode current collector
31 positive electrode mixture layer
40 negative electrode
50 spacer
51 lined projected portions

The invention claimed is:

1. A lithium secondary battery comprising: a positive electrode, a negative electrode disposed opposed to the positive electrode, a separator interposed between the positive electrode and the negative electrode, a non-aqueous electrolyte having a lithium ion conductivity, and a spacer interposed between the negative electrode and the separator, wherein a lithium metal deposits on the negative electrode during charging, and the lithium metal dissolves from the negative electrode during discharging, the spacer has a net structure formed with a plurality of lined projected portions, the negative electrode has a first surface, and a second surface at an opposite side of the first surface, the separator includes a first separator disposed at the first surface side and a second separator disposed at the second surface side, the spacer includes a first spacer disposed between the negative electrode and the first separator, and a second spacer disposed between the negative electrode and the second separator, the plurality of lined projected portions include a plurality of first lined projected portions and a plurality of second lined projected portions, the first spacer has a net structure formed with the plurality of first lined projected portions, the second spacer has a net structure formed with the plurality of second lined projected portions, and the first spacer and the second spacer are provided so that the plurality of first lined projected portions and the plurality of second lined projected portions cross each other, when seen from the normal direction of the first surface.

2. The lithium secondary battery of claim 1, having a connection portion connecting end portions of three or more of the lined projected portions next to each other.

3. The lithium secondary battery of claim 1, wherein the plurality of lined projected portions are configured integrally.

4. The lithium secondary battery of claim 1, wherein the net structure is disposed regularly.

5. The lithium secondary battery of claim 1, wherein a height of a portion of the lined projected portions is different from a height of a remaining portion of the lined projected portions.

6. The lithium secondary battery of claim 1, wherein the plurality of lined projected portions have a width of 1 mm or less.

7. The lithium secondary battery of claim 1, wherein the plurality of lined projected portions are formed of a resin material.

8. The lithium secondary battery of claim 1, wherein the net has a shape of a polygon.

9. The lithium secondary battery of claim 8, wherein the polygon is a hexagon.

10. The lithium secondary battery of claim 8, wherein the polygon has an internal angle of 120° or less.

11. The lithium secondary battery of claim 1, wherein the net has an opening area of 3.5 $mm^2$ or less per one net.

12. The lithium secondary battery of claim 1, wherein a ratio of an area covered with the spacer of a surface of the negative electrode relative to the area of the surface of the negative electrode is 21% or less.

* * * * *